United States Patent
Zhang et al.

(10) Patent No.: US 10,590,271 B2
(45) Date of Patent: Mar. 17, 2020

(54) BINDER COMPOSITION AND A PAINT FORMULATION MADE THEREOF

(71) Applicants: Dow Global Technologies LLC, Midland, MI (US); Rohm and Haas Company, Collegeville, PA (US); UCAR Emulsion Systems FZE, Dubai (AE)

(72) Inventors: Shiling Zhang, Shanghai (CN); Lukasz Zukowski, Dubai (AE); Yujiang Wang, Shanghai (CN); Dong Yun, Shanghai (CN); Ling Li, Shanghai (CN); Youjun Wu, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/556,302

(22) PCT Filed: Mar. 31, 2015

(86) PCT No.: PCT/CN2015/075462
§ 371 (c)(1),
(2) Date: Sep. 7, 2017

(87) PCT Pub. No.: WO2016/154879
PCT Pub. Date: Oct. 6, 2016

(65) Prior Publication Data
US 2018/0044516 A1    Feb. 15, 2018

(51) Int. Cl.
*C08L 33/00* (2006.01)
*C08L 33/02* (2006.01)
*C09D 133/02* (2006.01)

(52) U.S. Cl.
CPC ............ *C08L 33/02* (2013.01); *C09D 133/02* (2013.01); *C08L 2205/02* (2013.01); *C08L 2205/03* (2013.01)

(58) Field of Classification Search
CPC .......... C08L 33/02; C08L 33/08; C09D 5/02; C09D 5/29; C09D 133/02
USPC ......................................................... 524/27
See application file for complete search history.

(56) References Cited

U.S. PATENT DOCUMENTS

| | | |
|---|---|---|
| 2,591,904 A | 4/1952 | Zola |
| 3,058,931 A | 10/1962 | Petty |
| 3,442,824 A | 5/1969 | Chandler et al. |
| 3,458,328 A | 7/1969 | Zola |
| 3,725,089 A | 4/1973 | Zola |
| 3,950,283 A | 4/1976 | Sellars et al. |
| 4,127,687 A | 11/1978 | Dupont |
| 4,264,322 A | 4/1981 | Lewis et al. |
| 4,385,097 A | 5/1983 | Isozaki et al. |
| 4,826,535 A | 5/1989 | Godly |
| 4,898,895 A | 2/1990 | Masuoka et al. |
| 4,954,368 A | 9/1990 | Hartridge et al. |
| 5,114,481 A | 5/1992 | Lynch |
| 5,114,484 A | 5/1992 | Lynch |
| 5,114,485 A | 5/1992 | Lynch et al. |
| 5,199,801 A | 4/1993 | Grehn et al. |
| 5,199,980 A | 4/1993 | Lynch et al. |
| 5,268,030 A | 12/1993 | Floyd et al. |
| 5,314,535 A | 5/1994 | Lynch et al. |
| 5,318,619 A | 6/1994 | Lynch et al. |
| 5,437,719 A | 8/1995 | Lynch et al. |
| 5,480,480 A | 1/1996 | Lynch et al. |
| 5,593,731 A | 1/1997 | Akagi |
| 6,005,031 A | 12/1999 | Bremer-Masseus et al. |
| 6,074,474 A | 6/2000 | Broome et al. |
| 8,628,827 B2 | 1/2014 | Espinosa |
| 9,598,557 B2* | 3/2017 | Wang .................... C09D 133/12 |
| 10,017,657 B2* | 7/2018 | Zhang .................. C09D 105/00 |
| 2004/0225051 A1 | 11/2004 | Moy |
| 2005/0056187 A1 | 3/2005 | Podlas |
| 2005/0124759 A1 | 6/2005 | Heldmann et al. |
| 2006/0157196 A1 | 7/2006 | Koepnick et al. |
| 2006/0207476 A1 | 9/2006 | Coward et al. |
| 2008/0289538 A1 | 11/2008 | Friedrich et al. |
| 2009/0170978 A1 | 7/2009 | Kelly |
| 2010/0222459 A1* | 9/2010 | Kelly .................. C08B 37/0006 524/17 |

(Continued)

FOREIGN PATENT DOCUMENTS

| | | |
|---|---|---|
| AU | 560547 B2 | 4/1987 |
| CA | 1193372 | 9/1985 |

(Continued)

OTHER PUBLICATIONS

Machine Translation of CN 104212276 (Year: 2014).*
International Preliminary Report on Patentability; International Application No. PCT/CN2015/075462; International Filing Date Mar. 31, 2015; dated Jan. 12, 2016; 5 pages.
International Search Report; International Application No. PCT/CN2015/075462; International Filing Date Mar. 31, 2015; dated Jan. 12, 2016; 3 pages.
Written Opinion of the International Searching Authority; International Application No. PCT/CN2015/075462; International Filing Date Mar. 31, 2015; dated Jan. 12, 2016; 4 pages.

(Continued)

*Primary Examiner* — Hannah J Pak
(74) *Attorney, Agent, or Firm* — Karl E. Stauss; Cantor Colburn LLP

(57) ABSTRACT

The present invention further provides a binder composition comprising a first binder and a second binder. The first binder comprises, by dry weight based on total dry weight of the binder composition, from 1% to 98% polymer particles, from 0.3% to 20% an anionic polyelectrolyte, and from 0.1% to 20% a colorant; and the second binder comprises, by dry weight based on total dry weight of the binder composition, from 0.5% to 70% a clay, and from 0.03% to 10% a dispersant. It also provides a paint formulation comprising the binder composition.

11 Claims, No Drawings

(56) References Cited

U.S. PATENT DOCUMENTS

| | | |
|---|---|---|
| 2011/0236582 A1 | 9/2011 | Scheuing et al. |
| 2012/0094178 A1* | 4/2012 | Loveridge .............. H01M 4/134 |
| | | 429/217 |
| 2015/0059616 A1 | 3/2015 | Yun et al. |
| 2015/0065168 A1 | 3/2015 | Roskind et al. |
| 2015/0065618 A1 | 3/2015 | Yun et al. |
| 2015/0148457 A1 | 5/2015 | Yun et al. |
| 2017/0226364 A1 | 8/2017 | Zhang et al. |
| 2017/0298237 A1 | 10/2017 | Li et al. |
| 2017/0335133 A1* | 11/2017 | Zhang ....................... C08L 5/00 |

FOREIGN PATENT DOCUMENTS

| | | |
|---|---|---|
| CN | 1097782 A | 1/1995 |
| CN | 1117509 A | 2/1996 |
| CN | 1532240 A | 9/2004 |
| CN | 101397433 A | 4/2009 |
| CN | 101397483 A | 4/2009 |
| CN | 101397433 | 1/2012 |
| CN | 104212276 A | 12/2014 |
| CN | 104212286 A | 12/2014 |
| CN | 10444917 A | 3/2015 |
| CN | 104403470 A | 3/2015 |
| EP | 0287589 A1 | 10/1988 |
| EP | 0424594 A1 | 5/1991 |
| EP | 0505664 A1 | 9/1992 |
| EP | 0896988 A1 | 2/1999 |
| EP | 896988 A1 | 2/1999 |
| EP | 0896989 A1 | 2/1999 |
| EP | 1004638 A2 | 5/2000 |
| EP | 2223940 A1 | 9/2010 |
| GB | 977145 A | 12/1964 |
| GB | 1441268 A | 6/1976 |
| GB | 2078243 A | 1/1982 |
| JP | 57133170 | 8/1982 |
| JP | 2657554 B2 | 6/1991 |
| JP | 2004182789 A | 7/2004 |
| JP | 2006199726 A | 8/2006 |
| JP | 03840280 | 11/2006 |
| JP | 2007231151 | 9/2007 |
| JP | 2007238919 | 9/2007 |
| JP | 2007262350 A | 10/2007 |
| JP | 2007296459 | 11/2007 |
| JP | 2007321045 | 12/2007 |
| JP | 2011052052 A | 3/2011 |
| JP | 5149602 B2 | 2/2013 |
| KR | 541628 B1 | 1/2006 |
| KR | 854445 B | 8/2008 |
| KR | 854445 B1 | 8/2008 |
| RU | 2238287 C2 | 10/2004 |
| WO | 9315153 A1 | 8/1993 |
| WO | 9523197 A1 | 8/1995 |
| WO | 9532862 A1 | 12/1995 |
| WO | 0036029 A1 | 6/2000 |
| WO | 0248276 A1 | 6/2002 |
| WO | 2006029407 A2 | 3/2006 |
| WO | 2009133645 A1 | 11/2009 |
| WO | 201367243 A1 | 5/2013 |
| WO | 2013116004 A1 | 8/2013 |
| WO | 2013167243 A1 | 11/2013 |
| WO | 2013181800 A1 | 12/2013 |
| WO | 2016037312 A1 | 3/2016 |
| WO | 2016078020 A1 | 5/2016 |

OTHER PUBLICATIONS

European Search Report for European Application No. 1886865.3 dated Oct. 10, 2018, 9 pages.
Article 94(3) EPC Communication from EPO dated Jul. 25, 2019.
Lechner, M.D. et al., "Makromolekulare Chemie", Jan. 1, 2003, p. 237.
Odian, G., "Principles of Polymerization," 4th Ed., Feb. 27, 2004, pp. 1-38.
Stevens; M.P., "Polymer Chemistry; An Introduction," 3rd Ed., Dec. 31, 1999; pp. 53-57.
U.S. Appl. No. 14/403,695, filed Nov. 25, 2014, US2015/0148457, Pending.
U.S. Appl. No. 14/477,263, filed Sep. 4, 2014, US2015/0059616, U.S. Pat. No. 10,023,757.
U.S. Appl. No. 14/477,298, filed Sep. 4, 2014, US2015/0065618, U.S. Pat. No. 10,030,162.
U.S. Appl. No. 15/502,546, filed Feb. 8, 2017, US2017/0226364, U.S. Pat. No. 10,017,657.
U.S. Appl. No. 15/526,381, filed May 12, 2017, US2017/0335133, Pending.
U.S. Appl. No. 15/556,302, filed Sep. 12, 2017, US2018/0044516, Pending.
U.S. Appl. No. 16/014,465, filed Jun. 21, 2018, US2018/0298226, Pending.
International Search Report for International Application No. PCT/CN2014/091562; filed Nov. 19, 2014; dated Jun. 15, 2015; 4 pages.
International Search Report; International Application No. PCT/CN2014/086127; filed Sep. 9, 2014; dated Apr. 27, 2015; 4 pages.
Written Opinion of the International Searching Authority for International Application No. PCT/CN2014/091562; filed Nov. 19, 2014; dated Jun. 15, 2015; 4 pages.
Written Opinion of the International Searching Authority; International Application No. PCT/CN2017/086127; filed Sep. 9, 2014; dated Apr. 27, 2015; 3 pages.
Chang et al.; "Effects of mixed hydrocolloids on water-based multicolor coatings"; J. of Beijing Univ. of Chem. Tech.; vol. 37; No. 4; (2010) 5 pages with English Abstract.
Thielking et al.; "Cellulose Ethers"; Ullmann's Encyclopedia of Industrial Chemistry; vol. 7; 2006; pp. 381-397.
CN Search Report, CN Application No. 201580078125.9, dated Oct. 31, 2019.
Huang et al., "Fine Chemical Formula Commonly Used Raw Materials Manual", Guangdong Science and Technology Press, 1st Ed., Mar. 31, 1998, pp. 1102-1104, English Translation provided on Jan. 9, 2020 (NPL).
Wang Duoren, Ed., "Green Water Treatment Agent," Science and Technology Literature Publishing House, 1st Ed., Nov. 30, 2006, p. 51, English Translation provided on Jan. 9, 2020 (NPL).

* cited by examiner

BINDER COMPOSITION AND A PAINT FORMULATION MADE THEREOF

FIELD OF THE INVENTION

The present invention relates to a binder composition, in particular, a two-package binder composition. The present invention further relates to a paint formulation, in particular, a multi-color paint formulation, comprising the binder composition.

INTRODUCTION

The paint industry now has increased need for paint appearances that meet special customer requirements. Both conventional single-color paints and multi-color paints are being designed for customized appearances. Conventional single-color paints contain one colorant, while multi-color paints contain at least two colorants with different colors. Before application, with conventional operation methods such as spraying, brushing and rolling, the colorants shall be well and stably distributed and protected in the paints so as to provide desired paint film appearances.

The present invention provides a binder composition for paint formulations where after conventional operations such as brushing, trowel, rolling, and spraying, the colorants are protected in the globules of the binder composition and bring to the paint film a desired special appearance.

SUMMARY OF THE INVENTION

The present invention provides a binder composition comprising a first binder comprising by dry weight based on total dry weight of the first binder, from 2% to 99% polymer particles, from 0.4% to 40% an anionic polyelectrolyte, and from 0.2% to 50% a colorant.

The present invention further provides a binder composition comprising a first binder and a second binder. The first binder comprises, by dry weight based on total dry weight of the binder composition, from 1% to 98% polymer particles, from 0.3% to 20% an anionic polyelectrolyte, and from 0.1% to 20% a colorant; and the second binder comprises, by dry weight based on total dry weight of the binder composition, from 0.5% to 70% a clay and from 0.03% to 10% a dispersant.

The present invention further provides a paint formulation comprising the binder composition and a continuous phase comprising from 30% to 99%, by dry weight based on total dry weight of the continuous phase, polymer particles. The dry weight ratio of the continuous phase to the binder composition is from 50:1 to 1:20.

DETAILED DESCRIPTION OF THE INVENTION

The binder composition of the present invention comprises a first binder. The binder composition of the present invention further comprises a second binder.

The First Binder

The first binder of the present invention comprises by dry weight based on total dry weight of the binder composition, from 1% to 98%, preferably from 10% to 90%, and more preferably from 15% to 85%, polymer particles. The polymer particles are from 2% to 99%, preferably from 12% to 92%, and more preferably from 18% to 87% by dry weight based on total dry weight of the first binder.

The polymer particles comprise, as polymerization units, at least one $\alpha,\beta$-ethylenically unsaturated nonionic monomer, that is, $\alpha,\beta$-ethylenically unsaturated monomer without bearing an ionic charge between pH=1-14. Suitable examples of the $\alpha,\beta$-ethylenically unsaturated nonionic monomers include (meth)acrylic ester monomers, i.e., methacrylic ester or acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, and lauryl methacrylate; (meth)acrylonitrile; styrene and substituted styrene such as $\alpha$-methyl styrene, and vinyl toluene; butadiene; ethylene; propylene; $\alpha$-olefin such as 1-decene; vinyl esters such as vinyl acetate, vinyl butyrate, and vinyl versatate; and other vinyl monomers such as vinyl chloride and vinylidene chloride. Preferably, the $\alpha,\beta$-ethylenically unsaturated nonionic monomers are ethyl acrylate, methyl methacrylate, 2-hydroxybutyl acrylate, 2-hydroxyethyl methacrylate, 2-hydroxypropyl methacrylate, vinyl acetate, acrylonitrile, and any combination thereof.

Optionally, the polymer particles further comprise, as polymerization units, from 0.1% to 10%, and preferably from 0.5% to 5%, by dry weight based on total dry weight of the polymer particles, an ethylenically unsaturated monomer carrying at least one functional group selected from carboxyl, carboxylic anhydride, hydroxyl, amide, amino, ureido, acetoacetate, sulphonate, phosphonate, and any combination thereof. Suitable examples of these monomers are ethylenically unsaturated carboxylic or dicarboxylic acid such as acrylic or methacrylic acid, itaconic acid, and maleic acid; ethylenically unsaturated amide such as (meth)acrylamide; ethylenically unsaturated N-alkylolamide such as N-methylol(meth)acrylamide and 2-hydroxyethyl(meth)acrylamide; hydroxyalkyl ester of the carboxylic or dicarboxylic acid, such as hydroxyethyl (meth)acrylate and hydroxypropyl (meth)acrylate; amino-functional monomers such as N,N-dimethylaminoethyl methacrylate; ureido-functional monomers such as methacrylamidoethyl-2-imidazolidinone; monomers bearing acetoacetate-functional groups such as acetoacetoxyethyl methacrylate; and any combination thereof.

The first binder further comprises by dry weight based on total dry weight of the binder composition, from 0.3% to 20%, preferably from 0.5% to 15%, and more preferably from 1% to 10%, an anionic polyelectrolyte. The anionic polyelectrolyte is from 0.4% to 40%, preferably from 0.8% to 30%, and more preferably from 1.0% to 20% by dry weight based on total dry weight of the first binder.

The anionic polyelectrolyte is polyelectrolyte having a carboxylic acid anion, a sulfonic anion, a sulfate anion, a phosphonic anion, and any combination thereof. Preferably, the anionic polyelectrolyte is polyelectrolyte having a carboxylic acid anion. More preferably, it is completely neutralized or partially neutralized. And most preferably, it has a weight average molecular weight (Mw) of from $10^5$ to $10^8$. Suitable examples of the anionic polyelectrolyte include poly(acrylic acid sodium salt), poly(acrylic acid potassium salt), and poly(styrenesulfonic acid sodium salt).

The first binder further comprises by dry weight based on total dry weight of the binder composition, from 0.1% to 20%, preferably from 0.3% to 8%, and more preferably from 0.5% to 6%, a colorant. The colorant is from 0.2% to 50%, preferably from 0.6% to 17%, and more preferably from 0.8% to 10% by dry weight based on total dry weight of the first binder.

The colorants are organic or inorganic colorant particles, and preferably inorganic colorant particles. Suitable examples of the colorant particles include carbon black, lampblack, black iron oxide, red iron oxide, transparent red oxide, yellow iron oxide, transparent yellow oxide, brown iron oxide, phthalocyanine green, phthalocyanine blue, naphthol red, quinacridone red, quinacridone magenta, quinacridone violet, DNA orange, and organic yellow.

Optionally, the first binder further comprises by dry weight based on total dry weight of the binder composition, from 0.1% to 20%, preferably from 0.3% to 15%, and more preferably from 0.5% to 10%, a polysaccharide. The polysaccharide is from 0.2% to 30%, preferably from 0.6% to 20%, and more preferably from 1% to 15% by dry weight based on total dry weight of the first binder.

Examples of such polysaccharide include an acidic polysaccharide that can cross-link or precipitate with metal ions. Suitable examples of the polysaccharide include gellan, pectin, carrageenan, alginic acid, alginates, mixtures or any derivatives thereof. Preferably, the polysaccharide is alginic acid, alginate, or any combination thereof. Preferable, the polysaccharides exclude guar gum, and gelatin.

Optionally, the first binder further comprises by dry weight based on total dry weight of the binder composition, from 1% to 30%, preferably from 2% to 20%, and more preferably from 5% to 10%, pigment particles. The pigment particles are from 0.15% to 80.5%, preferably from 2.2% to 50.5%, and more preferably from 5.2% to 40.5% by dry weight based on total dry weight of the first binder.

The pigment particles refer to inorganic materials which are capable of materially contributing to the opacity (or hiding capability) of a composition. Such materials typically have a refractive index of greater than 1.8, and include titanium dioxide ($TiO_2$), zinc oxide, zinc sulfide, barium sulfate, barium carbonate, and lithopone. Titanium dioxide ($TiO_2$) is preferred.

Optionally, the first binder further comprises by dry weight based on total dry weight of the binder composition, from 0.5% to 50%, preferably from 1% to 30%, and more preferably from 3% to 20%, extender particles. The extender particles are from 0.6% to 50.5%, preferably from 1.5% to 30.5%, and more preferably from 3.5% to 20.5% by dry weight based on total dry weight of the first binder.

The extender particles refer to inorganic materials having a refractive index of less than or equal to 1.8 and greater than 1.3, and include calcium carbonate, calcium sulfate, aluminosilicate, silicate, zeolite, mica, diatomaceous earth, $Al_2O_3$, zinc phosphate, solid or hollow glass, and ceramic beads.

The Second Binder

The second binder of the present invention comprises by dry weight based on total dry weight of the binder composition, from 0.5% to 70%, preferably from 1.0% to 30%, and more preferably from 3% to 20%, a clay.

The clay refers to hydrous phyllosilicates with magnesium, aluminum, lithium sodium and other metal elements. Suitable examples of the clay include lithium magnesium silicate commercially available as LAPONITE™ RD and LAPONITE RDS from Rockwood Additives Ltd., aluminum magnesium silicate commercially available as VEEGUM™ from Vanderbilt Company, Inc., and any combination thereof.

The second binder further comprises by dry weight based on total dry weight of the binder composition, from 0.03% to 10%, preferably from 0.1% to 5%, and more preferably from 0.3% to 3%, a dispersant.

Suitable examples of the dispersants include sodium orthophosphate, sodium pyrophosphate, sodium tripolyphosphate, sodium tetraphospahte, sodium hexametaphosphate, sodium carbonate, sodium polyphosphate, sodium metaphosphate, and sodium hydroxide. Sodium ion can be also replaced by other monovalent alkali metal ions, such as lithium and potassium. Preferably, the dispersant is sodium pyrophosphate.

Optionally, the second binder further comprises by dry weight based on total dry weight of the binder composition, from 0.1% to 30%, preferably from 2% to 20%, and more preferably from 5% to 15%, the polymer particles.

Preparation of Either Binder

Either binder of the present invention is prepared by mixing the binder components in water and with stirring. For single-color paints, one colorant is added to the first binder, while for multi-color paints, at least two different colorants are added individually to different first binders. Each first binder comprises only one colorant.

Preparation of the Binder Composition

The binder composition of the present invention is prepared by simply mixing the first binder with the second binder. For multi-color paints, each first binder was mixed with each second binder to prepare different binder compositions. Different binder compositions comprising different first binders comprising different colorants are therefore mixed together to prepare the binder composition for multi-color paints.

The Paint Formulation

The binder composition is made into a paint formulation by dispersing the binder composition into a continuous phase; the continuous phase is prepared by mixing polymer emulsion with paint additives.

Dry weight ratio of the continuous phase to the binder composition (or dispersed phase) is from 50:1 to 1:20, preferably from 20:1 to 1:10, and more preferably from 10:1 to 1:5.

The continuous phase comprises by dry weight based on total dry weight of the continuous phase, from 30% to 99%, preferably from 50% to 95%, and more preferably from 70% to 92%, the polymer particles.

Optionally, the continuous phase further comprises by dry weight based on total dry weight of the continuous phase, from 0.5% to 65%, preferably from 1% to 40%, and more preferably from 5% to 30%, the extender particles.

Multi-color paints may also be prepared through mixing different single-color paint formulation made according to the above process. Suitable examples of the paint additives include coalescing agents, cosolvents, surfactants, buffers, neutralizers, thickeners, non-thickening rheology modifiers, dispersants, humectants, wetting agents, mildewcides, biocides, plasticizers, antifoaming agents, defoaming agents, anti-skinning agents, flowing agents, and anti-oxidants.

Suitable examples of the thickener include alkali-soluble emulsions (ASE), hydrophobically modified alkali soluble emulsions (HASE), hydrophobically modified ethylene oxide-urethane polymers (HEUR), hydrophobically modified hydroxyethyl cellulose (HMHEC), hydrophobically modified polyacrylamide, and fumed silica.

Paint Operations

The paint formulations may be operated by conventional operation methods including troweling, brushing, rolling, and spraying methods.

Suitable substrates for such paint operations include concrete board, cement board, medium-density fiber (MDF) board, particle board, gypsum board, wood, stone, metal, plastics, wall paper and textile. Preferably, all the substrates are pre-primed by waterborne or solvent-borne primers.

EXAMPLES

I. Raw Materials

| Ingredients | Supplier |
| --- | --- |
| A-190 poly(acrylic acid sodium salt) (Mw: $7 \times 10^6$) (A-190) | MT Aquapolymer, Inc. |
| NAPA SS30A poly(acrylic acid sodium salt) (Mw: $3 \times 10^7$ to $5 \times 10^7$) (NAPA) | Nippon LinHai Co., Ltd. |

| Ingredients | Supplier |
|---|---|
| SOKALAN ™ PA 30 CL poly(acrylic acid sodium salt) (Mw: 8 × 10³) (PA 30 CL) | BASF Company |
| HZ-200 clay (HZ-200) | Huizhi Fine Chemical Ltd. |
| sodium pyrophosphate (SPP) | Sinopharm Chemical Reagent Co., Ltd. |
| LAPONITE ™ RD clay (RD) | Rockwood Additives Limited |
| MANUCOL ™ DM alginate (DM) | FMC Company |
| XERACOLOUR ™ blue colorant (blue) | ICC International Chemical |
| XERACOLOUR ™ red colorant (red) | ICC International Chemical |
| XERACOLOUR ™ grey colorant (grey) | ICC International Chemical Corporation |
| TI-PURE ™ R706 TiO₂ (TiO₂) | E.I. du Pont Company |
| PRIMAL ™ TX-010 acrylic emulsion (TX-010) | The Dow Chemical Company |
| PRIMAL ™ TX-100 acrylic emulsion (TX-100) | The Dow Chemical Company |
| ACRYSOL ™ SCT 275 rheology modifier | The Dow Chemical Company |
| ACRYSOL ™ RM-12W rheology modifier | The Dow Chemical Company |
| TEXANOL ™ ester alcohol | Eastman Chemical Company |
| TERGITOL ™ 15-S-40 (70%) surfactant | The Dow Chemical Company |
| NOPCO NXZ defoamer (NXZ) | Nopco Inc. |
| calcium chloride (CaCl₂) | Sinopharm Chemical Reagent Co., Ltd. |

II. Experimental Examples

1. Preparation of Binder Compositions (Binders) 1 to 7 (For Single-Color Paint), Binder Composition (Binder) 8 (For Multi-Color Paint) and Comparative Binder Compositions (Comparative Binders) 9 to 12

Preparation of the first binder for Binder Composition 1: 0.4 g A-190 poly (acrylic acid sodium salt), was dispersed in 25.9 g DI water by stirring at 200-1500 rpm for 5 min, and then kept at room temperature overnight with stirring at 500-2000 rpm. When the A-190 was dissolved, 24 g PRIMAL TX-010 acrylic emulsion, 1.2 g TEXANOL ester alcohol and 1.0 g XERACOLOUR red colorant were added into the above solution with stirring at 500 rpm for 20 min.

Preparation of the second binder for Binder Composition 1: 2 g HZ-200 clay and 0.2 g sodium pyrophosphate were dispersed in 37.8 g DI water, and then 8 g PRIMAL TX-010 acrylic emulsion was added by stirring at 100-500 rpm for 10 min.

Preparation of binder composition for Binder Composition 1: 52 g first binder and 48 g second binder were mixed by stirring at 10-300 rpm for 10 min.

The first and the second binders for Binder Compositions 2 to 7 and Comparative Binder Compositions 9 to 12 were prepared according to the above process of preparation for the first and the second binders for Binder Composition 1, with detailed binder components listed in Table 1.

The Binder Compositions 1 to 7 and Comparative Binder Compositions 9 to 12 were prepared by mixing corresponding first binder and second binder and stirred at 10-300 rpm for 10 min.

Binder Composition 8 was prepared by mixing at a ratio of 4:5:1 of three different binder compositions each comprising one different red, blue or grey colorant prepared according to the procedure of making Binder Composition 7.

TABLE 1

TABLE 1-a

| Binder Compositions | | Binder 1 | Binder 2 | Binder 3 |
|---|---|---|---|---|
| The first binder | anionic polyelectrolyte | 2.8% (4.3%)* A-190 | 1.3% (1.4%)* NAPA | 12.3% (38.0%)* A-190 |
| | polysaccharide | — | — | — |
| | polymer particles | 58.7% (90.3%)* TX-010 | 90.3% (96.9%)* TX-100 | 4.8% (14.8%)* TX-010 |
| | colorant | 3.5% (5.4%)* red | 1.6% (1.7%)* red | 15.3% (47.2%)* blue |
| The second binder | clay | 14.0% HZ-200 | 6.3% HZ-200 | 61.4% RD |
| | peptizing agent | 1.4% SPP | 0.6% SPP | 6.2% SPP |
| | polymer particles | 19.6% TX-100 | — | — |
| | Total | 100.0 | 100.0 | 100.0 |

TABLE 1-b

| Binder Compositions | | Binder 4 | Binder 5 | Binder 6 | Binder 7 |
|---|---|---|---|---|---|
| The first binder | anionic polyelectrolyte | 1.7% (2.3%)* NAPA | 1.4% (1.7%)* A-190 | 4.4% (4.8%)* A-190 | 1.7% (2.3%)* NAPA |
| | polysaccharide | 1.7% (2.3%)* DM | 0.5% (0.6%)* DM | 7.3% (7.9%)* DM | 1.7% (2.3%)* DM |
| | polymer particles | 69.0% (92.6%)* TX-100 | 81.6% (96.1%)* TX-100 | 73.0% (79.4%)* TX-100 | 69.0% (92.6%)* TX-100 |

TABLE 1-continued

|  |  |  |  |  |  |
|---|---|---|---|---|---|
|  | colorant | 2.1% (2.8%%)* blue | 1.4% (1.7%)* grey | 7.3% (7.9%)* grey | 2.1% (2.8%)* red |
| The second binder | clay peptizing agent polymer particles | 4.2% HZ-200 0.4% SPP 20.9% TX-100 | 1.4% HZ-200 0.1% SPP 13.6% TX-100 | 7.3% RD 0.7% SPP — | 4.2% HZ-200 0.4% SPP 20.9% TX-100 |
|  | Total | 100.0 | 100.0 | 100.0 | 100.0 |

TABLE 1-c

| Binder Compositions | | Comparative Binder 9 | Comparative Binder 10 | Comparative Binder 11 | Comparative Binder 12 |
|---|---|---|---|---|---|
| The first binder | anionic polyelectrolyte | — — | 2.8% (4.3%)* PA 30 CL — | 0.1% (0.1%)* NAPA 1.7% (2.3%)* DM | 1.7% (2.2%)* NAPA 1.7% (2.2%)* DM |
|  | polysaccharide | | | | |
|  | polymer particles | 61.5% (94.6%)* TX-100 | 58.7% (90.3%)* TX-100 | 70.6% (94.8%)* TX-100 | 73.0% (93.0%)* TX-100 |
|  | colorant | 3.5% (5.4%)* red | 3.5% (5.4%)* red | 2.1% (2.8%)* blue | 2.1% (2.7%)* blue |
| The second binder | Clay peptizing agent polymer particles | 14.0% HZ-200 1.4% SPP 19.6% TX-100 | 14.0% HZ-200 1.4% SPP 19.6% TX-100 | 4.2% HZ-200 0.4% SPP 20.9% TX-100 | 0.2% HZ-200 0.4% SPP 20.9% TX-100 |
|  | Total | 100.0 | 100.0 | 100.0 | 100.0 |

*% is dry weight percentage based on total dry weight of the binder composition, unless otherwise indicated within the parentheses, which is dry weight percentage based on total dry weight of the first binder.

2. Preparation of Single-Color Paint Formulations (Paints) 1 to 7, Multi-Color Paint Formulation (Paint) 8 and Comparative Paint Formulations (Comparative Paints) 9 to 12

Preparation of Paint Formulation 1 (Paint 1) from Binder 1 (without comprising polysaccharide): 3.6 g TEXANOL ester alcohol and 0.5 g NOPCO NXZ defoamer were added into 85 g PRIMAL TX-100 acrylic emulsion under stirring, then 2.0 g ACRYSOL SCT 275 rheology modifier was dispersed into above emulsion, then 48 g Binder 1 was dispersed into the emulsion under stirring at 10-100 rpm for 10 min.

Paint Formulations 2, 3, and Comparative Paint Formulations 9 and 10 (formulations without comprising polysaccharide) were prepared from Binder Compositions 2, 3, and Comparative Binder Compositions 9 and 10, respectively, according to the above process of preparation for Paint Formulation 1.

Preparation of Paint Formulation 4 (Paint 4) from Binder 4 (comprising polysaccharide): 0.35 g TERGITOL 15-S-40 surfactant was added into 70.0 g PRIMAL TX-100 acrylic emulsion by stirring, followed by addition of 0.5 g NOPCO NXZ deformer, 0.9 g 20% $CaCl_2$ solution, 3.2 g TEXANOL ester alcohol, 1.0 g ACRYSOL SCT 275 rheology modifier and 0.3 g ACRYSOL RM-12W rheology modifier in sequence. After that, 10 g Binder 4 was dispersed into the emulsion under stirring at 10-100 rpm for 10 min.

Paint Formulations 5 to 8, and Comparative Paint Formulations 11 and 12 (formulations comprising polysaccharide) were prepared from Binder Compositions 5 to 8, and Comparative Binder Compositions 11 and 12, respectively, according to the above process of preparation for Paint Formulation 4.

III. Test Methods

1. Colorant Protection

Binder compositions were observed of forming globules when they were added in to the continuous phase and prepared to paint formulations. By observing through naked eyes, if colorants were not released from the globules into the continuous phase or there was no color leaking out of the globules and in contact directly in the case of multi-color paints, the colorant was considered as protected; otherwise, the colorant was considered as not protected.

2. Heat Aging Test 300 mL of each paint formulation was added into a 500 mL capped plastic bottle and heated under 50° C. in a Lindberg/Blue M™ vacuum oven of Thermal Electron Corporation for 10 Days. Paint formulations with good colorant protection were observed by naked eyes for gelation or syneresis after heat aging. Paint formulations were stable if neither gelation nor syneresis was observed.

IV. Results

TABLE 2

| Paint Formulations | Binder Compositions | Colorant protection | Heat aging test |
|---|---|---|---|
| Paint 1 | Binder 1 | Protected | Stable |
| Paint 2 | Binder 2 | Protected | Stable |
| Paint 3 | Binder 3 | Protected | Stable |
| Paint 4 | Binder 4 | Protected | Stable |
| Paint 5 | Binder 5 | Protected | Stable |
| Paint 6 | Binder 6 | Protected | Stable |
| Paint 7 | Binder 7 | Protected | Stable |
| Paint 8 | Binder 8 | Protected | Stable |
| Comparative Paint 9 | Comparative Binder 8 | Not protected | — |
| Comparative Paint 10 | Comparative Binder 9 | Not protected | — |
| Comparative Paint 11 | Comparative Binder 10 | Not Protected | — |
| Comparative Paint 12 | Comparative Binder 11 | Not protected | — |

Comparative Paint Formulation 9 (Comparative Paint 9) lacked the anionic polyelectrolyte, and Comparative Paint Formulation 11 (Comparative Paint 11) comprised insufficient amount of the anionic polyelectrolyte. Both Comparative Paints 9 and 11 could not protect the colorant. The result indicated the importance of the anionic polyelectrolyte, and its concentration.

Comparative Paint Formulation 10 (Comparative Paint 10) comprised an anionic polyelectrolyte of Mw less than $1 \times 10^5$. Comparative Paint 10 could not protect the colorant. The result indicated the importance of anionic polyelectrolyte Mw.

Comparative Paint Formulation 12 (Comparative Paint 12) comprised insufficient amount of the clay in its second paint. Comparative Paint 12 could not protect the colorant. The result indicated the importance of the clay.

Paint Formulations 1 to 8 (Paints 1 to 8) comprised required amounts of required components. Paints 1 to 8 well protected the colorant, and are all heat aging stable.

What is claimed is:

1. A binder composition comprising a first binder comprising by dry weight based on total dry weight of the first binder,
    from 2% to 99% polymer particles,
    from 0.4% to 40% an anionic polyelectrolyte, wherein the anionic polyelectrolyte has a weight average molecular weight of from $10^5$ to $10^8$, and
    from 0.2% to 50% a colorant.

2. The binder composition according to claim 1 wherein the first binder further comprises from 0.2% to 30%, by dry weight based on total dry weight of the first binder, a polysaccharide.

3. The binder composition according to claim 1 wherein the first binder further comprises from 0.15% to 80.5%, by dry weight based on total dry weight of the first binder, pigment particles.

4. The binder composition according to claim 1 wherein the first binder further comprises 0.6% to 50.5%, by dry weight based on total dry weight of the first binder, extender particles.

5. A binder composition comprising a first binder and a second binder, wherein the first binder comprises, by dry weight based on total dry weight of the binder composition,
    from 1% to 98% polymer particles,
    from 0.3% to 20% an anionic polyelectrolyte, wherein the anionic polyelectrolyte has a weight average molecular weight of from $10^5$ to $10^8$, and
    from 0.1% to 20% a colorant; and
the second binder comprises, by dry weight based on total dry weight of the binder composition,
    from 0.5% to 70% clay, and
    from 0.03% to 10% a dispersant.

6. The binder composition according to claim 5 wherein the first binder further comprises from 0.1% to 20%, by dry weight based on total dry weight of the binder composition, a polysaccharide.

7. The binder composition according to claim 5 wherein the first binder further comprises from 1% to 30%, by dry weight based on total dry weight of the binder composition, pigment particles.

8. The binder composition according to claim 5 wherein the first binder further comprises from 0.5% to 50%, by dry weight based on total dry weight of the binder composition, extender particles.

9. The binder composition according to claim 5 wherein the second binder further comprises from 0.1% to 30%, by dry weight based on total dry weight of the binder composition, polymer particles.

10. A paint formulation comprising the binder composition according to claim 5 and a continuous phase comprising from 30% to 99%, by dry weight based on total dry weight of the continuous phase, polymer particles, wherein the dry weight ratio of the continuous phase to the binder composition is from 50:1 to 1:20.

11. The paint formulation according to claim 10 wherein the continuous phase further comprises from 0.5% to 65%, by dry weight based on total dry weight of the continuous phase, extender particles.

* * * * *